(12) United States Patent
Kollaja et al.

(10) Patent No.: US 6,280,845 B1
(45) Date of Patent: Aug. 28, 2001

(54) MULTILAYER FILMS HAVING AT LEAST FIVE FILM LAYERS, WHEREIN AT LEAST ONE LAYER IS FLAME RETARDANT

(75) Inventors: Richard A. Kollaja, Dusseldorf (DE); Douglas A. Devens, Saint Paul; Patrise M. Russell, Berchwood, both of MN (US); Mark A. Hoisington, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/381,844

(22) PCT Filed: Nov. 30, 1998

(86) PCT No.: PCT/US98/25393
§ 371 Date: Sep. 23, 1999
§ 102(e) Date: Sep. 23, 1999

(87) PCT Pub. No.: WO99/28128
PCT Pub. Date: Jun. 10, 1999

Related U.S. Application Data

(63) Continuation-in-part of application No. 08/980,920, filed on Dec. 1, 1997, now Pat. No. 6,045,895.

(51) Int. Cl.$^7$ .................................................. B32B 9/04
(52) U.S. Cl. .................... 428/411.1; 428/500; 428/689; 428/696; 428/702; 428/704; 428/921
(58) Field of Search ................................. 428/213, 214, 428/215, 216, 354, 480, 40.1, 910, 920, 921, 411.1, 689, 696, 702, 704, 500

(56) References Cited

U.S. PATENT DOCUMENTS

| | | | |
|---|---|---|---|
| Re. 24,906 | 12/1960 | Ulrich | 206/59 |
| 2,736,721 | 2/1956 | Dexter | 260/42 |
| 3,565,985 | 2/1971 | Schrenk et al. | 264/171 |
| 3,645,837 | 2/1972 | Chisholm et al. | 161/160 |
| 3,650,880 | 3/1972 | Tieniber | 161/89 |
| 4,107,232 | 8/1978 | Haaf et al. | 260/876 |
| 4,201,820 | 5/1980 | Johnson | 428/195 |
| 4,488,619 | 12/1984 | O'Neill | 181/290 |
| 4,673,695 | 6/1987 | Aubert et al. | 521/64 |
| 4,792,480 | 12/1988 | Freund et al. | 428/286 |
| 4,818,603 | 4/1989 | Mueller | 428/316.6 |
| 4,833,179 | 5/1989 | Young et al. | 522/183 |
| 4,927,647 | * 5/1990 | Bailey | 426/126 |
| 4,975,316 | 12/1990 | Romanowski | 428/247 |
| 5,160,784 | 11/1992 | Shmidt et al. | 428/316.6 |
| 5,209,971 | 5/1993 | Babu et al. | 428/343 |
| 5,250,350 | 10/1993 | Tung | 428/216 |
| 5,344,697 | 9/1994 | Romanowski | 428/247 |
| 5,389,324 | 2/1995 | Lewis et al. | 264/171 |
| 5,427,842 | 6/1995 | Bland et al. | 428/213 |
| 5,461,134 | 10/1995 | Leir et al. | 528/14 |
| 5,589,122 | 12/1996 | Leonard et al. | 264/146 |
| 5,599,602 | 2/1997 | Leonard et al. | 428/56 |
| 5,660,922 | 8/1997 | Herridge et al. | 428/214 |

FOREIGN PATENT DOCUMENTS

| | | |
|---|---|---|
| 33051/95 | 4/1996 | (AU) . |
| 2187516 | 1/1974 | (FR) . |

OTHER PUBLICATIONS

Kirk–Othmer Encyclopedia of Technology, 4$^{th}$ Ed., vol. 10, pp. 936–998, John Wiley & Sons, N.Y., N.Y., 1993.

Han, Multiphase Flow in Polymer Processing, *Academic Press*, N.Y., 1981, pp. 229–235.

Elmendorpp, Dispersive Mixing in Liquid Systems, *Mixing in Polymer Processing*, C. Rauwendaal Ed., Marcel Dekker, Inc., N.Y., pp. 17–53, No year.

* cited by examiner

Primary Examiner—Bruce H. Hess
Assistant Examiner—Ling Xu
(74) Attorney, Agent, or Firm—Kent S. Kokko

(57) ABSTRACT

The present invention provides unified multilayer films having at least one layer that includes a flame retardant film layer. In preferred embodiments the flame retardant film layer is an internal layer. In particularly preferred embodiments of the present invention, multilayer films include flame retardant layers alternating with non flame retardant layers. In other preferred embodiments, multilayer films include alternating layer of different flame retardant materials.

17 Claims, No Drawings

US 6,280,845 B1

MULTILAYER FILMS HAVING AT LEAST FIVE FILM LAYERS, WHEREIN AT LEAST ONE LAYER IS FLAME RETARDANT

This application is a continuation-in-part of Ser. No. 08/980,920 filed on Dec. 1, 1997 now U.S. Pat. No. 6,045,895.

TECHNICAL FIELD

This invention relates to flame retardant films, and more particularly, multilayer films having flame-retardant layers.

BACKGROUND OF THE INVENTION

Flame retardant films have been used in many applications where polymeric properties offer unique performance advantages over properties of other inherently flame retardant materials such as metal sheets and foils, and ceramics. Typically, the polymeric articles are either inherently flame retardant or rendered flame retardant by the addition of flame retardant additives. However, these approaches are limiting.

Polymer films made of inherently flame retardant polymers such as polyvinyl chloride (PVC) and polyimide (PI) usually have a limited range of properties. For example plasticizers are generally added to PVC to render it more readily processable, however plasticizer migration often adversely affects adhesion to subsequent surfaces. In addition, PVC generally has little elasticity and low to moderate tensile strength. Similarly, PI is difficult to process and more expensive than most common polymers.

Polymer films made of blends of polymer materials and flame retardant materials also have limited performance. While the range of polymer materials is broad, the concentration of flame retardant material is generally high enough to significantly adversely affect mechanical properties of the polymer material. In addition, the flame retardant materials often migrate to the film surfaces and adversely affect adhesion to subsequent surfaces.

Thus, there is a need for new flame retardant polymeric films and articles that have a broader range of mechanical mechanical properties and reduced surface fouling.

SUMMARY OF THE INVENTION

The present invention provides flame retardant films that not only have desirable mechanical properties and reduced surface fouling, but have improved flame retardant efficiency and/or reduced cost when compared with conventional flame retardant polymer films or articles. The present invention provides unified multilayer films of at least five film layers wherein at least one layer, preferably an internal layer, comprises a flame retardant film layer and at least one layer comprises a non-flame retardant film layer.

Preferably, multilayer films include layers that include a flame-retardant film alternating with layers that include a film that is not a flame retardant. In other preferred embodiments, multilayer films have layers of different flame retardant films. For example, the construction can include alternating layers of a first flame retardant film, a second flame retardant film and a non-flame retardant film.

One aspect of the present invention provides a multilayer film having a unified construction of at least 5, preferably 10, more preferably at least 13 substantially contiguous film layers wherein at least one layer (preferably one internal layer) comprises a flame retardant film layer and at least one layer comprises a non-flame retardant film layer.

Another aspect of the present invention provides a multilayer film having a unified construction; wherein the construction comprises at least 5, preferably 10, more preferably at least 13 substantially contiguous layers of organic polymeric material; the construction comprising layers comprising a flame retardant film alternating with layers comprising a film that is not flame retardant.

The present invention also provides a process of preparing a flame-retardant multilayer film. The process includes melt processing organic polymeric material to form a unified construction of at least 5 substantially contiguous film layers of organic polymeric material, wherein at least one internal layer of the organic polymeric material comprises a flame retardant film. Preferably, all the layers are simultaneously melt processed, and more preferably, all the layers are simultaneously coextruded.

A further aspect of the present invention provides a process of preparing a multilayer film, the process comprising melt processing organic polymeric material to form a unified construction of at least 5 substantially contiguous layers of organic polymeric material, the construction comprises film layers comprising a flame retardant film layer, alternating with non flame retardant film layers.

Herein, the following definitions are used:

"Unified" means that the layers are not designed to be separated or delaminated as would a tape in roll form.

"Flame retardant" means a characteristic of basic flammability has been reduced by some modification as measured by one of the accepted test methods such as the Horizontal Burn or Hanging Strip tests.

"Flame retardant additive" means a compound or mixture of compounds that when incorporated (either chemically or mechanically) into a polymer serves to slow or hinder the ignition or growth of fire.

"Flame retardant films" means polymeric films which are inherently flame retardant, or have been rendered flame retardant by means of a flame retardant additive.

"Melt processable" means polymers that are fluid or pumpable at the temperatures used to melt process the films (e.g., about 50° C. to about 300° C.), and do not significantly degrade or gel at the temperatures employed during melt processing.

"Pressure sensitive adhesive" means an adhesive that displays permanent and aggressive tackiness to a wide variety of substrates after applying only light pressure. It has a four-fold balance of adhesion, cohesion, stretchiness, and elasticity, and is normally tacky at use temperatures, which is typically room temperature (i.e., about 20° C. to about 30° C.).

"Melt viscosity" means the viscosity of molten material at the processing temperatures and shear rates employed.

DETAILED DESCRIPTION OF PREFERRED EMBODIMENTS

The present invention is directed to multilayer products in the form of films of organic polymeric material, wherein the films have at least one layer, preferably at least one internal layer that includes a flame retardant film layer and at least one layer comprises a non-flame retardant film layer. Each of the other layers may include a flame retardant film layer, or a film layer that is not a flame retardant. In certain preferred embodiments there are flame retardant film layers alternating with film layers that are not flame retardant. In other preferred embodiments there are alternating layers of a first flame retardant film layer, a second flame retardant film layer and a non-flame retardant film layer. The two outermost film layers may be flame retardant films, nonflame retardant films, or one of the outermost layers may include a flame retardant film layer and the other a film layer that is non flame retardant. Each layer of the construction is continuous and has a substantially contiguous relationship to the adjacent layers. Preferably, each layer is substantially uniform in thickness. The multiple layers in any one construction are "unified" into a single multilayer film such that the layers do not readily separate.

Flame retardant films used in the flame retardant film layer(s) include films which are inherently flame retardant, or have been rendered flame retardant by means of a flame retardant additive. Inherently flame retardant films are prepared from polymers, which due to their chemical structure either do not support combustion, or are self-extinguishing. These polymers often have increased stability at higher temperatures by incorporating stronger bonds (such as aromatic rings or inorganic bonds) in the backbone of the polymers or are highly halogenated. Examples of inherently flame retardant polymers include poly(vinyl chloride), poly (vinylidine chloride), polyimides, polybenzimidazoles, polyether ketones, polyphosphazenes, and polycarbonates. Useful inherently flame retardant films generally have a Limiting Oxygen Index (LOI) of at least 28% as determined by ASTM D-2863-91.

Useful flame retardant additives include halogenated organic compounds, organic phosphorus-containing compounds (such as organic phosphates), inorganic compounds and inherently flame retardant polymers. These additives are added to or incorporated into the polymeric matrix of the polymer film to render an otherwise flammable polymer flame retardant. The nature of the flame retardant additive is not critical and a single additive may be used. Optionally, it may be desirable to use a mixture of two or more individual flame retardant additives.

Halogenated organic flame retardant additives are thought to function by chemical interaction with the flame: the additive dissociates into radical species that compete with chain propagating and branching steps in the combustion process. Useful halogenated additives are described, for example, in the Kirk-Othmer Encyclopedia of Technology, 4$^{th}$ Ed., vol. 10, pp 954–76, John Wiley & Sons, N.Y., N.Y., 1993.

Included within the scope of halogenated organic flame retardant additives are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

The preferred halogenated organic flame retardant additives for this invention are aromatic and aliphatic halogen compounds such as brominated benzene, brominated imides, chlorinated biphenyl, or a compound comprising two phenyl radicals separated by a divalent linking group (such as a covlaent bond and having at least two chlorine or bromine atoms per phenyl nucleus, chlorine containing aromatic polycarbonates, and mixtures of at least two of the foregoing. Especially preferred are hexabromobenzene, decabromodiphenyl oxide and tetrabromobisphenol A.

Among the useful organic phosphorus additives are organic phosphorus compounds, phophorus-nitrogen compounds and halogenated organic phosphorus compounds. Often organic phosphorus compounds function as flame retardants by forming protective liquid or char barriers, which minimize transpiration of polymer degradation products to the flame and/or act as an insulating barrier to minimize heat transfer.

In general, the preferred phosphate compounds are selected from organic phosphonic acids, phosphonates, phosphinates, phosphonites, phosphinites, phosphine oxides, phosphines, phosphites or phosphates. Illustrative is triphenyl phosphine oxide. These can be used alone or mixed with hexabromobenzene or a chlorinated biphenyl and, optionally, antimony oxide. Phosphorus-containing flame retardant additives are decribed, for example, in Kirk-Othmer (supra) pp. 976–98.

Typical of the preferred phosphorus compounds to be employed in this invention would be those having the general formula

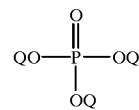

and nitrogen analogs thereof where each Q represents the same or different radicals including hydrocarbon radicals such as alkyl, cycloalkyl, aryl, alkyl substituted aryl and aryl substituted alkyl; halogen, hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenyl-bis-3,5,5'-trimethylhexyl phosphate), ethyidiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phsophate, p-tolyl bis(2,5,5'-trimethylhexyl) phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides or phosphinic acid amides.

Among the useful inorganic flame retardant additives include compounds of antimony, such as antimony trioxide, antimony pentoxide, and sodium antimonate; boron, such as barium metaborate, boric acid, sodium borate and zinc borate; aluminum, such as aluminum trihydroxide, magnesium, such as magnesium hydroxide; molybdenum, such as molybdic oxide, ammonium molybdate and zinc molybdate, phosphorus, such as phosphoric acid; and tin, such as zinc stannate. The mode of action is often varied and may include inert gas dilution, (by liberating water for example), and thermal quenching (by endothermic degradation of the additive). Useful inorganic additives are described for example in Kirk-Othmer (supra), pp 936–54.

Especially useful are mixed additives of an antimony additive and a halogenated organic additive, describes as "antimony-halogen" additives which produces an especially effective flame retardant. The two additives react synergistically at flame temperatures to produce an antimony halide or oxyhalide which produce radical species (which compete with chain propagating and branching steps in the combustion process) as well as promoting char formation.

Inherently flame retardant polymers may be used in the form of films, in the form of particles dispersed in a polymer matrix, or as a blend in a compatible polymer. Examples of inherently flame retardant polymers include poly(vinyl chloride), poly(vinylidine chloride), polyimides, polybenzimidazoles, polyether ketones, polyphosphazenes, polycarbonates and polysiloxanes.

The additives are generally incorporated into the flame retardant film layers by addition of the additive(s) to the melt prior to film formation. The materials may be added neat, as a melt blend of the additive in a polymer, or with the use of a cosolvent or comptatibilizer to render the additive and polymer compatible, which may be subsequently removed prior to film formation. When using an inherently flame-retardant polymer as an additive, it may be melt blended if compatible, or a cosolvent or compatibilizer may be used. Alternatively the inherently flame-retardant polymer additive may be added as fine particles to the melt. In the case of halogenated organic additives and organic phosphorus additives, they may be added neat in the form of liquid or solids to the melt. Care should be exercised to choose an additive that is stable at the melt temperature of the polymer.

The particle size of the inorganic additive (or organic additives which do not melt) should be less than the the thickness of the flame retardant-film layer(s) into which it is incorporated to ensure uniform thickness of the multilayer film. Preferably the particle size is less than one-half, more preferably less than one-third the thickness of the flame retardant film layer(s). In general, the smaller the particle, or the more surface area the particle presents, the more effective the flame retardant properties.

Generally, when using a low viscosity liquid flame retardant additive, it is preferable to use a low viscosity polymer, whereby the best dispersion is obtained when the two viscosities of the polymer matrix and dispersed phases are closely matched. Alternatively, when using a solid flame retardant it is preferable to use a high viscosity polymer as high viscosities are necessary to generate the stresses necessary to produce a homogenous dispersion. Viscosities may also be matched by judicious selection of process temperature conditions. Further information on multiphase flow in polymer processing may be found in Han, *Multiphase Flow in Polymer Processing*, Academic Press, N.Y., 1981, pp 229–235 and in Elmendorpp, Dispersive Mixing in Liquid Systems, Mixing in Polymer Processing, C. Rauwendaal, ed., Marcel Dekker, Inc., N.Y., pp. 17–53.

Flame retardant additives are added in sufficient amounts to render the multilayer film flame retardant. Generally the additives are added in amounts of 40 wt. % or more in each flame retardant layer. Preferably the additives are added in amounts of at least 50 wt. % in each flame retardant layer or in the amounts of 10 to 90 wt. % of the unified multilayer film.

Polymeric materials used in the multilayer films of the present invention include one or more melt-processible organic polymers, which may include thermoplastic, thermoplastic elastomeric or elastomeric materials. Thermoplastic materials are generally materials that flow when heated sufficiently above their glass transition temperature, or if semicrystalline, above their melt temperatures, and become solid when cooled. They may be elastomeric or nonelastomeric.

Thermoplastic materials useful in the present invention that are generally considered nonelastomeric include, for example, polyolefins such as isotactic polypropylene, low density polyethylene, linear low density polyethylene, very low density polyethylene, medium density polyethylene, high density polyethylene, polybutylene, nonelastomeric polyolefin copolymers or terpolymers such as ethylene/propylene copolymer and blends thereof; ethylene-vinyl acetate copolymers such as those available under the trade designation ELVAX from E.I. DuPont de Nemours, Inc., Wilimington, Del.; ethylene acrylic acid copolymers; ethylene methacrylic acid copolymers such as those available under the trade designation SURLYN from E.I. DuPont de Nemours, Inc.; polymethylmethacrylate; polystyrene; ethylene vinyl alcohol; polyesters including amorphous polyester; and polyamides.

Elastomers, as used herein, are distinct from thermoplastic elastomeric materials in that the elastomers require crosslinking via chemical reaction or irradiation to provide a crosslinked network which imparts modulus, tensile strength, and elastic recovery. Elastomers useful in the present invention include, for example, natural rubbers such as CV-60, a controlled viscosity grade of rubber, and SMR-5, a ribbed smoked sheet rubber; butyl rubbers, such as Exxon Butyl 268 available from Exxon Chemical Co., Houston, Tex.; synthetic polyisoprenes such as CARIFLEX, available from Shell Oil Co., Houston, Tex., and NATSYN, available from Goodyear Tire and Rubber Co., Akron, Ohio; ethylene-propylenes; polybutadienes; polybutylenes; polyisobutylenes such as VISTANEX, available from Exxon Chemical Co.; and styrene-butadiene random copolymer rubbers such as AMERIPOL SYNPOL available from American Synpol Co., Port Neches, Tex.

In the present invention, preferred organic polymers and homo- and copolymers of polyolefins including polyethylene, polypropylene and polybutylene homo- and copolymers.

Thermoplastic materials that have elastomeric properties are typically called thermoplastic elastomeric materials. Thermoplastic elastomeric materials are generally defined as materials that act as though they were covalently crosslinked at ambient temperatures, exhibiting high resilience and low creep, yet process like thermoplastic nonelastomers and flow when heated above their softening point. Thermoplastic elastomeric materials useful in the multilayer films of the present invention include, for example, linear, radial, star, and tapered block copolymers (e.g., styrene-isoprene block copolymers, styrene-(ethylene-butylene) block copolymers, styrene-(ethylene-propylene) block copolymers, and styrene-butadiene block copolymers); polyetheresters such as that available under the trade designation HYTREL from E.I. DuPont de Nemours, Inc.; elastomeric ethylene-propylene copolymers; thermoplastic elastomeric polyurethanes such as that available under the trade designation MORTHANE URETHENE from Morton International, Inc., Chicago, Ill.; polyvinylethers; poly-α-olefin-based thermoplastic elastomeric materials such as those represented by the formula $-(CH_2CHR)_x$ where R is an alkyl group containing 2 to 10 carbon atoms, and poly-α-olefins based on metallocene catalysis such as ENGAGE, ethylene/poly-α-olefin copolymer available from Dow Plastics Co., Midland, Mich.

The multilayer films are typically prepared by melt processing (e.g., extruding). In a preferred method, the flame retardant and non-flame retardant layers are generally formed at the same time, joined while in a molten state, and cooled. That is, preferably, the layers are substantially simultaneously melt-processed, and more preferably, the layers are substantially simultaneously coextruded. Products formed in this way possess a unified construction and have a wide variety of useful, unique, and unexpected properties, which provide for a wide variety of useful, unique, and unexpected applications.

Preferably, the multilayer films range in thickness from about 25 to about 750 micrometers ($\mu$m) thick (more preferably, no greater than about 150 $\mu$m, and most preferably, no greater than about 50 $\mu$m). The thickness (or volume fraction) of the multilayer film and the individual film layers depend primarily on the end-use application and the desired composite mechanical properties of the multi-layered film. Such multilayer films have a construction of at least 5 layers, preferably, at least 10 layers, more preferably, at least 13 layers, and even more preferably, at least 29 layers. For preferred embodiments, there are generally no more than about 500 layers, more preferably, no more than about 200 layers, and most preferably, no more than about 100 layers, although it is envisioned that constructions having many more layers can be made using the materials and methods described herein.

Depending on the polymers and additives chosen, thicknesses of the layers, and processing parameters used, the multilayer films will typically have different properties at different numbers of layers. That is, the same property (e.g., tensile strength, modulus, fire retardancy) may go through maximum at a different number of layers for two particular materials when compared to two other materials.

In any one construction of the alternating layers of flame retardant film layers and non flame retardant film layers, each of the flame retardant layers typically includes the same material (flame retardant additive in a polymer matrix or in an inherently flame retardant polymer) or combination of materials, although they may include different materials or combinations of materials. Similarly, each of the layers that is not flame retardant typically includes the same material or combination of materials, although they may include different materials or combinations of materials.

Multilayer films can include an $(AB)_n$ construction, with either A and/or B layers as the outermost layers (e.g., $(AB)_nA$, $(BA)_nB$, or $(AB)_n$). In such constructions, each of the B layers has flame retardant properties as a result of the incorporation of a flame retardant additive or the use of an inherently flame retardant polymer, which may be the same or different in each layer, and each of the A layers does not have flame retardant properties, which may be the same or different in each layer. Multilayer films can also include A, A' B, and B' film layers, with any of the A, A', B or B' layers as the outermost layers. Preferably the A layers are the outermost layers. In such constructions, each of the B and B' layers may include a different flame retardant film layer and each of the B layers may include a different non-flame retardant film layer. In each of these constructions, n is preferably at least 2, and more preferably, at least 5, depending on the materials used and the application desired.

In embodiments with alternating different flame retardant layers (B,B'), the multilayer films can take advantage of the properties of each of the flame retardant film layers. For example, a construction with alternating layers of an organic halogenated flame retardant and an inorganic antimony trioxide flame retardant has the synergistic effect of reducing the concentration of radical species and promoting char formation. Similarly the use of organic halogenated flame retardant and hydrated alumina will retard flames by reducing radical species and the enthalpy of combustion.

Preferred embodiments include three or more layers of a flame-retardant additive in a polymer matrix and three or more layers of the same polymer matrix that is not a flame retardant (i.e lacking the flame-retardant additive). More preferred embodiments include only two types of materials, one inherently flame retardant polymer and one that is not flame retardant in alternating layers. Other preferred embodiments include only two different flame-retardants in alternating layers.

The two outermost layers of multilayer films of the present invention can include one or more flame-retardant films, which may be the same or different in each of the two outermost layers. Alternatively, the two outermost layers can include one or more films that are not flame retardant, which may be the same or different in each of the two outermost layers. Furthermore, the inventive films include embodiments in which only one of the outermost layers includes one or more flame-retardant films.

The individual layers of multilayer films of the present invention can be of the same or different thicknesses. Preferably, each internal layer is no greater than about 25 micrometers ($\mu$m) thick, and more preferably, no greater than about 5 $\mu$m thick. Each of the two outermost layers can be significantly thicker than any of the inner layers, however. Preferably, each of the two outermost layers is no greater than about 150 $\mu$m thick, more preferably no greater than 50 $\mu$m thick. Typically, each layer, whether it be an internal layer or one of the outermost layers, is at least about 0.01 $\mu$m thick, depending upon the materials used to from the layer and the desired application.

Multilayer films wherein one or more of the layers is a flame retardant can be made that have many significant and unexpected properties. These can include, for example, good flame resistance, reduced surface fouling, good weatherability, relatively low material costs, good flame resistance, and sufficient tensile strength for handling, relatively high break elongation and toughness, relatively high yield and break stress, good drape and softness, good stretch release properties, and paper-like tensile, elongation and tear properties. Each multilayer film of the present invention will not necessarily have all of these advantageous properties. This will depend on the number of layers, the types of materials, the affinity of the materials for each other, the modulus of the different materials, and the like.

Preferably one or both of the outer layers are not flame retardant, the multilayer films can be used as single- or double-sided flame retardant tapes, nonadhesive films for use as backings for tapes, or flame retardant films for use as adhesive layers in tapes, for example. This is because they have advantageous mechanical properties, tensile strength, a relatively high break elongation (i.e., elongation at break) and toughness, good yield and break stress, as well as beneficial tear properties, despite the incorporation of one or more flame retardant film layers.

When used as a backing for an adhesive tape, the multilayer film of the present invention may further comprise a pressure-sensitive adhesive layer. Pressure sensitive adhesives useful in the present invention can be self tacky or require the addition of a tackifier. Such materials include, but are not limited to, tackified natural rubbers, tackified synthetic rubbers, tackified styrene block copolymers, self-tacky or tackified acrylate or methacrylate copolymers, self-tacky or tackified poly-$\alpha$-olefins, and tackified silicones. Examples of suitable adhesives are described in U.S. Pat. No. Re 24,906 (Ulrich), U.S. Pat. No. 4,833,179 (Young et al.), U.S. Pat. No. 5,209,971 (Babu et al.), U.S. Pat. No. 2,736,721 (Dexter), and U.S. Pat. No. 5,461,134 (Leir et al.), for example. Others are described in the *Encyclopedia of Polymer Science and Engineering*, vol. 13, Wiley-Interscience Publishers, New York, 1988, the *Encyclopedia of Polymer Science and Technology*, vol. 1, Interscience Publishers, New York, 1964 and in D. Satas, *Handbook of Pressure Sensitive Adhesives*, 2$^{nd}$ Edition, Van Nostrand Reinhold, New York, 1989.

A pressure sensitive adhesive useful in the present invention typically has an open time tack (i.e., period of time during which the adhesive is tacky at room temperature) on the order of days and often months or years. An accepted quantitative description of a pressure sensitive adhesive is given by the Dahlquist criterion line (as described in *Handbook of Pressure Sensitive Adhesive Technology*, Second Edition, D. Satas, ed., Van Nostrand Reinhold, New York, N.Y., 1989, pages 171–176), which indicates that materials having a storage modulus (G') of less than about $3 \times 10^5$ Pascals (measured at 10 radians/second at a temperature of about 20° C. to about 22° C.) typically have pressure sensitive adhesive properties while materials having a G' in excess of this value typically do not.

Suitable polymers for use in preparing the films of the present invention, whether they are inherently flame retardants or not, are melt processable. That is, they are fluid or pumpable at the temperatures used to melt process the films (e.g., about 50° C. to about 300° C.), and they are film formers. Furthermore, suitable polymers do not significantly degrade or gel at the temperatures employed during melt processing (e.g., extruding or compounding). Preferably, such polymers have a melt viscosity of about 10 poise to about 1,000,000 poise, as measured by capillary melt rheometry at the processing temperatures and shear rates employed in extrusion. Typically, suitable polymers possess a melt viscosity within this range at a temperature of about 175° C. and a shear rate of about 100 seconds$^{-1}$.

In melt processing multilayer films of the present invention, the polymers in adjacent layers need not be chemically or physically compatible or well matched, particularly with respect to melt viscosities, although they can be if so desired. That is, although materials in adjacent polymeric flowstreams can have relative melt viscosities (i.e., ratio of their viscosities) within a range of about 1:1 to about 1:2, they do not need to have such closely matched melt viscosities. Rather, the materials in adjacent polymeric flowstreams can have relative melt viscosities of at least about 1:5, and often up to about 1:20. For example, the melt viscosity of a flowstream of polymer B (or A) can be similar or at least about 5 times, and even up to about 20 times, greater than the melt viscosity of an adjacent flowstream of polymer A (or B).

In melt processing polymers of different flame retardants film layers and/or non flame retardant film layers, the differences in elastic stresses generated at the interface between the layers of different flame retardants is also important. Preferably, these elastic differences are minimized to reduce or eliminate flow instabilities that can lead to layer breakup. With knowledge of a material's elasticity, as measured by the storage modulus on a rotational rheometer over a range of frequencies (0.001 rad/sec. $<\omega<100$ rad/sec.) at the processing temperature, along with its viscosity at shear rates less than 0.01 second$^{-1}$, and the degree to which the material's viscosity decreases with shear rate, one of skill in the art can make judicious choices of the relative thicknesses of the layers, the die gap, and the flow rate to obtain a film with continuous, uniform layers. Generally, the elastic stresses at 100 sec$^{-1}$ by a more viscous polymer should be greater than the elastic stress generated by the less viscous polymer. Further, the ratio of the storage modulus to the viscosity at 0.01 sec$^{-1}$ for the more viscous polymer should be greater than that of the less viscous polymer.

Significantly, relatively incompatible materials (i.e., those that typically readily delaminate as in conventional two layer constructions) can be used in the multilayer films of the present invention. Although they may not be suitable for all constructions, they are suitable for the constructions having larger numbers of layers. That is, generally as the number of layers increases, relatively incompatible materials can be used without delamination occurring. in addition, film properties such as elongation at break and toughness often increase as the number of layers increases, depending on the materials used.

The flame retardant layer (B or B') can include a single flame retardant, a mixture (e.g., blend) of several flame retardants, or a mixture (e.g., blend) of a flame retardant and a material that is not a flame retardant (e.g., a nontacky thermoplastic material, which may or may not be elastomeric), as long as the layer has flame retardant properties. Examples of some flame retardant blends are described in Kirk-Othmer (supra). Similarly, the nonflame retardant layer (A or A') can include a single polymer that is not a flame retardant, a mixture of several such polymers, , as long as the layer does not have flame retardant properties.

The materials of the non-flame retardant layer (A or A') can be modified with one or more processing aids, such as plasticizers and lubricants, to modify their properties. Plasticizers and lubricants useful with the polymeric materials are preferably miscible at the molecular level, i.e., dispersible or soluble in the thermoplastic material. External lubricants that are incompatible with the polymer can also be added that act by migrating to the surface of the polymer melt and reducing frictions with the extrusion equipment (the die or extruder barrel for example). Examples of plasticizers and lubricants include, but are not limited to, polybutene, paraffinic oils and waxes, fatty acids including stearic acid and calcium stearate, petrolatum, liquid rubbers, and certain phthalates with long aliphatic side chains such as ditridecyl phthalate. When used, a processing aid is typically present in an amount of about 5 parts to about 300 parts by weight, and preferably up to about 200 parts by weight, based on 100 parts by weight of the polymeric material in the nonflame retardant layer.

Other additives, such as fillers, pigments, crosslinking agents, antioxidants, ultraviolet stabilizers, and the like, may be added to modify the properties of either the flame retardant layers (B or B) or the nonflame retardant layers (A or A'). Each of these additives is used in an amount to produce the desired result.

Pigments and fillers can be used to modify cohesive strength and stiffness, cold flow, and tack, as well as chemical resistance and gas permeability. For example, aluminum hydrate, lithopone, whiting, and the coarser carbon blacks such as thermal blacks also increase tack with moderate increase in cohesivity, whereas clays, hydrated silicas, calcium silicates, silico-aluminates, and the fine furnace and thermal blacks increase cohesive strength and stiffness. Platy pigments and fillers, such as mica, graphite, and talc, are preferred for acid and chemical resistance and low gas permeability. Other fillers can include glass or polymeric beads or bubbles, metal particles, fibers, and the like. Typically, pigments and fillers are used in amounts of about 0.1% to about 20% by weight, based on the total weight of the multilayer film.

Crosslinkers such as benzophenone, derivatives of benzophenone, and substituted benzophenones such as acryloyloxybenzophenone may also be added. Such crosslinkers are preferably not thermally activated, but are activated by a source of radiation such as ultraviolet or electron-beam radiation subsequent to forming the films. Typically, crosslinkers are used in amounts of about 0.1% to about 5.0% by weight, based on the total weight of the multilayer film.

Antioxidants and/or ultraviolet stabilizers may be used to protect against severe environmental aging caused by ultraviolet light or heat. These include, for example, hindered phenols, amines, and sulfur and phosphorus hydroxide decomposers. Typically, antioxidants and/or ultraviolet stabilizes are used in amounts of about 0.1% to about 5.0% by weight, based on the total weight of the multilayer film.

Intermediate layers may be used in a multilayered construction to adhere different polymeric materials having insufficient interlayer adhesion. Intermediate layers, or tie layers, generally have an affinity for both of the principal layers and typically consist of materials that will not significantly reduce the overall tensile properties of the multilayer construction. Some useful tie layers include, for example, copolymers containing blocks that have an affinity for each of the principal layers, which flow when melted and cool to a tack-free state.

Tie layers, which are typically hot melt adhesive (i.e., tacky when in the melt state), can also be used to enhance the adhesion between each of the layers if so desired. Materials useful in the tie layers include, ethylene/vinyl acetate copolymer (preferably containing at least about 10% by weight of vinyl acetate units), carboxylated ethylene/vinyl acetate copolymer such as that available under the trade designation CXA, from E.I. DuPont de Nemours, Inc., copolymers of ethylene and methyl acrylate such as that commercially available under the trade designation POLY-ETH EMA, from Gulf Oil and Chemicals Co., ethylene/acrylic acid copolymer such as that available under the trade designation SURLYN (a copolymer of ethylene with a methacryic acid) from E.I. DuPont de Nemours, Inc., maleic anhydride modified polyolefins and copolymers of polyolefins such as that commercially available under the trade designation MODIC, from Mitsubishi Chemical Co., polyolefins containing homogeneously dispersed vinyl polymers such as those commercially available under the trade designation VMX from Mitsubishi Chemical Co. (e.g., FN-70, an ethylene/vinyl acetate based product having a total vinyl acetate content of 50% and JN-70, an ethylene/vinyl acetate based product containing dispersed polymethylmethacrylate and having a vinyl acetate content of 23% and a methyl methacrylate content of 23%), POLYBOND (believed to be a polyolefin grafted with acrylic acid) from B.P. Chemicals Inc., Cleveland, Ohio, PLEXAR (believed to be a polyolefin grafted with ftinctional groups) from Quantum Chemicals, inc., Cincinnati, Ohio, a copolymer of ethylene and acrylic acid such as that commercially available under the trade designation PRIMACOR from Dow Chemical Co., Midland, Mich., and a copolymer of ethylene and methacrylic acid such as that commercially available under the trade designation NUCREL from E.I. DuPont de Nemours, Inc.

The multilayer films of the present invention can be prepared directly by extrusion, for example, with the outermost layers being preferably non flame retardant. Frequently, incorporation of a flame retardant into one or both of the outermost layers can degrade the surface and/or mechanical properties of the outermost layer. Halogenated organic flame retardants, for example, may tend to migrate to the surface of the film and render the surface non-amenable to further coating, by a pressure sensitive adhesive for example. Alternatively, the films can be made with one or both of the outermost layers being flame retardant layer(s) depending on the application.

The multilayer films of the present invention can be used as the backings or substrates for single-sided or double-sided adhesive products, such as tapes. Preferably the multilayer films used as backings in tape have a non flame retardant layer as at least one of the outermost layers. Such films can be prepared using extrusion techniques, for example, to produce such products directly (i.e., with one or both outermost layers of the film being an a pressure sensitive adhesive layer). Alternatively, a multilayer film can be coated with an adhesive material using conventional coating techniques. Furthermore, such products can be coated with a low-adhesion backsize (LAB) material, which restricts adhesion of various types of surfaces to the film when it is wound as a coil or is stacked on itself A wide variety of known adhesive materials (e.g., any of the pressure sensitive materials described herein) and LAB materials (e.g., polyolefins, urethanes, cured silicones, fluorochemicals) can be used as well as a wide variety of known coating techniques, including solvent coating and extrusion coating techniques.

Multilayer films of the present invention can be made using a variety of equipment and a number of melt-processing techniques (typically, extrusion techniques) well known in the art. Such equipment and techniques are disclosed, for example, in U.S. Pat. No. 3,565,985 (Schrenk et al.), U.S. Pat. No. 5,427,842 (Bland et al.), U.S. Pat. No. 5,589,122 (Leonard et al.), U.S. Pat. No. 5,599,602 (Leonard et al.), and U.S. Pat. No. 5,660,922 (Herrid(e et al.). For example, single- or multi-manifold dies, full moon feedblocks (such as those described in U.S. Pat. No. 5,389,324 to Lewis et al.), or other types of melt processing equipment can be used, depending on the number of layers desired and the types of materials extruded.

For example, one technique for manufacturing multilayer films of the present invention can use a coextrusion technique, such as that described in U.S. Pat. No. 5,660,922 (Herridge et al.). In a coextrusion technique, various molten streams are transported to an extrusion die outlet and joined together in proximity of the outlet. Extruders are in effect the "pumps" for delivery of the molten streams to the extrusion die. The precise extruder is generally not critical to the process. A number of useful extruders are known and include single and twin screw extruders, batch-off extruders, and the like. Conventional extruders are commercially available from a variety of vendors such as Davis-Standard Extruders, Inc. (Pawcatuck, Conn.), Black Clawson Co. (Fulton, N.Y.), Berstorff Corp. (N.C.), Farrel Corp. (Conn.), and Moriyama Mfr. Works, Ltd. (Osaka, Japan).

Other pumps may also be used to deliver the molten streams to the extrusion die. They include drum loaders, bulk melters, gear pumps, and the like, and are commercially available from a variety of vendors such as Graco LTI (Monterey, Calif.), Nordson (Westlake, Calif.), Industrial Machine Manufacturing (Richmond, V.A.), and Zenith Pumps Div., Parker Hannifin Corp. (N.C.).

Typically, a feedblock combines the molten streams into a single flow channel. The distinct layers of each material are maintained because of the laminar flow characteristics of the streams. The molten structure then passes through an extrusion die, where the molten stream is reduced in height and increased in width so as to provide a relatively thin and wide construction. This type of coextrusion is typically used to manufacture multilayer film constructions having about 10 layers or more.

However, the use of a feedblock is optional, as a variety of coextrusion die systems are known. For example, multi-manifold dies may also be employed, such as those commercially available from The Cloeren Company (Orange, Tex). In multimanifold dies, each material flows in its own manifold to the point of confluence. In contrast, when feedblocks are used, the materials flow in contact through a single manifold after the point of confluence. In multimanifold die manufacturing, separate streams of material in a flowable state are each split into a predetermined number of smaller or sub-streams. These smaller streams are then combined in a predetermined pattern of layers to form an array of layers of these materials in a flowable state. The layers are in intimate contact with adjacent layers in the array. This array generally comprises a stack of layers which is then compressed to reduce its height. In the multimanifold die approach, the film width remains constant during compression of the stack, while the width is expanded in the feedblock approach. In either case, a comparatively thin, wide film results. Layer multipliers in which the resulting film is split into a plurality of individual subfilms which are then stacked one upon another to increase the number of layers in the ultimate film may also be used. The multimanifold die approach is typically used in manufacturing multilayer film constructions having less than about 10 layers.

In manufacturing the films, the materials may be fed such that either a flame retardant layer or the non-flame retardant layer forms the outermost layers. The two outermost layers are often formed from the same material. Preferably, although not necessarily, the materials comprising the various layers are processable at the same temperature. Significantly, although it has been generally believed that the melt viscosities of the various layers should be similar, this is not a necessary requirement of the methods and products of the present invention. Accordingly, residence times and processing temperatures may have to be adjusted independently (i.e., for each type of material) depending on the characteristics of the materials of each layer The volume fraction of the A and B layers depends primarily on the ratio of the viscosities of the component polymers or polymer mixtures (including the addition of the flame retardant additive). For example, if the outer "A" layer has a higher viscosity than the "B" layer, process stability considerations suggest that the "B" layer have a greater volume fraction (i.e >50%). Conversely, if the A layer has a lower viscosity than the B layer, process stability should increase if the B layer has a smaller (i.e. <50%) volume fraction. These considerations are generally true regardless of the number of layers and the total flow rate of the process.

Other manufacturing techniques, such as lamination, coating, or extrusion coating may be used in assembling multilayer films and products from such multilayer films according to the present invention. For example, in lamination, the various layers of the film are brought together under temperatures and/or pressures (e.g., using heated laminating rollers or a heated press) sufficient to adhere adjacent layers to each other.

In extrusion coating, a first layer is extruded onto a cast web, a uniaxially oriented film, or a biaxially oriented film, and subsequent layers are sequentially coated onto the previously provided layers. Extrusion coating may be preferred over the melt coextrusion process described above if it is desirable to pretreat selected layers of the multilayer film or if the materials are not readily coextrudable.

Continuous forming methods include drawing the multilayer film out of a film die and subsequently contacting the extruded multilayer film with a moving plastic web or other suitable substrate, After forming, the multilayer films are solidified by quenching using both direct methods, such as chill rolls or water baths, and indirect methods, such as air or gas impingement.

The films of the present invention can be oriented, either uniaxially (i.e., substantially in one direction) or biaxially (i.e., substantially in two directions), if so desired. Such orientation can result in improved strength properties, as evidenced by higher modulus and tensile strength. Preferably, the films are prepared by co-extruding the individual polymers to form a multi layer film and then orienting the film by stretching at a selected temperature. For example, uniaxial orientation can be accomplished by stretching a multilayer film construction in the machine direction at a temperature of about the melting point of the film, whereas biaxial orientation can be accomplished by stretching a multilayer film construction in the machine direction and the cross direction at a temperature of about the melting point of the film. Optionally heat-setting at a selected temperature may follow the orienting step.

EXAMPLES

This invention is further illustrated by the following examples which are not intended to limit the scope of the invention. In the examples, all parts, ratios and percentages are by weight unless otherwise indicated. The following test methods were used to characterize the flame retardant films in the examples:

Test Methods

Horizontal Burn

Burning characteristics of multilayer films were evaluated according to ASTM D1000 except the film were first laminated to a 25 micrometer thick layer of pressure-sensitive adhesive (a blend of 50 parts KRATON™ 1107 polystyrene/poluisoprene block coplolymer available from Shell Chemical, 50 parts NATSYNT™ 2210 polyisoprene homopolymer available from Goodyear Tire and Rubber, 75 parts WINTACK PLUS™ hydrocarbon tackifier available from Goodyear, 30 parts ENDEX 160™ end-block reinforcing resin and 2 parts IRGANOX™ 1010 antioxidant available from CIBA-Giegy, as described in U.S. Pat. No. 5,500, 293) as in the vertical burn test) to permit the film to stick to a brass rod that was used in the test. The brass rod was wrapped with two overlapping layers of tape and supported in a horizontal position. A gas burner flame was applied for 30 seconds and immediately removed. The time required for the sample to self-extinguish is measured. This test differentiates among tapes with wide ranges of burning characteristics but is less precise for tapes of narrow ranges of burning characteristics.

Hanging Strip

Burning characteristics of multilayer films were evaluated according to ASTM 568-77 A45 cm×25 cm with a 38 cm gauge length sample was suspended from a clamp inside a protective metal shield that was located in a fume hood. A gas burner flame of a given height was applied until film ignited. Flame was removed immediately and the time needed to burn 38 cm of sample length or for sample to self-extinguish was measured. This test differentiates among tapes with wide ranges of burning characteristics but is less precise for tapes of narrow ranges of burning characteristics.

Tensile Testing

Tensile properties of the multilayer films were evaluated using a standard tensile/elongation method on an Instron mechanical testing frame at 12 inches/minute (30.5 cm/minute). Sample were of 0.5 inches width (1.27 cm) and gauge length of 4 inches (10.2 cm). Thickness ofthe samples depended on process conditions and were measured using a Mitutoyo Liner Thickness Gage.

| Materials Used | |
|---|---|
| Material | Description |
| Fina ™ 3374 | Isotactic polypropylene available from Fina Oil & Chem, Dallas, TX. |
| Rexflex ™ W101 | Significantly atactic polypropylene available from Huntsman Polypropylene Corp., Woodbury, NJ. |
| 1 Nat-2P-W | A brominated imide and antimony trioxide blended into a polyethylene polymer at a 45:55 weight concentration with a 3:1 ratio of brominated imide to antimony., available as PE Conc. 1 Nat-2P-W from M.A Hannah, Elk Grove Village, IL. |
| LLDPE 6806 | Liner low density polyethylene, available from Dow Chemical Co., Midland MI. |
| SpaceRite ™ S11 | Alumina trihydroxide, available from Alcoa Chemicals, Charlotte, NC. |
| Engage ™ 8100 | A metallocene polymerized olefin, containing 24% octane comonomer available from Dow Chemical Co., Midland, MI. |
| LDPE 1550 | Low density polyethylene, available from Eastman Chemical Products, Inc., Kingsport, TN. |
| ATH FR | Alumina trihydroxide compounded with ethylene vinyl acetate at a 60% by weight concentration, available from Mach 1 Compounding, Macedonia, Ohio. |
| Elvax ™ 410 | An ethylene vinyl-acetate copolymer available from E.I. DuPont de Nemours, Inc., Wilmington DE. |
| O521-48 FR | Magnesium hydroxide compounded with polypropylene at a 50% by weight concentration, available from Mach 1 Compounding, Macedonia, Ohio. |
| Escorene ™ 3445 | Isotactic polypropylene available from Exxon Chemical Co. |
| Environstrand | A blend of tetrabromobisphenol A with antimony oxide in atactic polypropylene, available as Environstrand 5P280 from Great Lakes Chemical, West Lafayette, IN |
| PPSC 912 | An ethylene-propylene copolymer with a melt index of 65, available as Profax SC 912 from Montell North America, Wilmington DE |

Examples 1–3, Comparative Examples 1–4

Examples 1–3 were multilayer films having 13 layers of a construction $A(BA)_5BA$. They were prepared to illustrate the effect on overall flame retardant properties of using various amounts of a flame retardant additive in a B layer compared to using similar amounts in a blended composition.

In Example 1, the non flame retardant layers were made of Rexflex™ W101 and 35% Fina™ 4 3374, melt mixed in a weight ratio of 65:35 and conveyed in a BERLYN single screw extruder (BERLYN, 51 mm, having an L/D of 30/1, commercially available from Berlyn Corp., Worchester, Mass., operating with zone temperatures increasing from 149° C. to 238° C.) to A slots of a feedblock having 13 slots. The feedblock, made as described in U.S. Pat. No. 4,908,278 (Bland et al.), allowed two flow streams fed into the 13 slots in an alternating manner to come together in a multilayer flow stream having layers arranged as $A(BA)_5BA$. The temperature of both the feedblock and the die were set at 204° C. The flame retardant layers were made from 1 Nat-2P-W, fed by a single screw extruder (KILLION Model KTS-125, 32 mm, having an L/D of 24/1, commercially available from Killion, Inc., Cedar Grove, N.J.) operating with zone temperatures increasing from 132° C. to 238° C. into B slots of the feedblock. The resulting multilayered flow stream was passed through a single orifice film die and drop cast onto a chill roll set at a temperature of 15° C. and collected. The line speed was 4.6 m/min., the individual flowrates of A and B were such that flame retardant material comprised a calculated 14.3 weight percent of the overall multilayered film and the overall thickness was measured at 150 micrometers.

Examples 2 and 3 were made essentially as in Example 1, except the flow rates of the materials were adjusted to obtain flame retardant concentrations of 33.3 and 47 weight percent, respectively.

In Comparative Example 1, the same material used in the A layer of Example 1 was fed into the Berlyn extruder of Example 1, conveyed through a feedblock and a single layer die and drop cast onto a chill roll. The temperatures of the extruder increased from 149° C. to 238° C., the feedblock and the die were set at a temperature of 204° C. and the chill roll was set at a temperature of 15° C. The overall thickness was 150 micrometers and the flame retardant concentration was 0 weight percent.

Comparative Examples 2–4 were made essentially as in Comparative Example 1 except the flame retardant additive used in the B layers of Example 1 was melt blended to result in an overall flame retardant concentration in weight percent of 14.3, 33.3 and 47, respectively.

Examples 1–3 and Comparative Examples 1–4 were tested for Hanging Strip Flammability, and Horizontal Burn. The test results, film layers and flame retardant concentrations are shown in Tables 1 and 2.

TABLE 1

| | | FR | Hanging Strip | |
|---|---|---|---|---|
| Ex. | Layers | % | Flame | Comments |
| 1 | 13 | 14.3 | 3 sec, SE | Flaming drips |
| 2 | 13 | 33.3 | 3 sec, SE | Flaming drips, hard to ignite |
| 3 | 13 | 47.0 | <1 sec, SE | Very difficult to ignite |
| C1 | 1 | 0.0 | 34 sec, 38 cm | Flaming drips |
| C2 | 1 | 14.3 | 17 sec, 38 cm | Flaming drips, easy to ignite, |
| C3 | 1 | 33.3 | 15 sec, SE | Flaming drips |
| C4 | 1 | 47.0 | 2 sec, SE | No drips |

As seen, the films of the invention exhibited improved flame retardant performance as blends having the same overall concentration of flame retardant material.

TABLE 2

| | | FR | Horizontal Burn | |
|---|---|---|---|---|
| Ex. | Layers | % | Flame | Comments |
| 1 | 13 | 14.3 | 18 sec | No drips, high char |
| 2 | 13 | 33.3 | 1 sec | No drips, high char |
| 3 | 13 | 47.0 | <1 sec | No drips, high char |
| C1 | 1 | 0.0 | 127 sec | Flame drips, all tape burned |
| C2 | 1 | 14.3 | 11 sec | Flame drips, low char |
| C3 | 1 | 33.3 | 16 sec | No drips, high char |
| C4 | 1 | 47.0 | 4 sec | No drips, high char |

As seen, the films of the invention exhibited improved flame retardant performance over blends having the same overall concentration of flame retardant material when the flame-retardant concentration was sufficient.

Example 4 and Comparative Examples 5–6

Example 4 illustrates the effect of two flame retardant materials in the flame-retardant layer on overall flame retardant performance.

A multilayer film was made essentially as in Example 1, varying the polymer matrix. Flame retardant additive and process conditions as noted. The non flame retardant "A" layers were made of Reflex™ W101 and Fina™ 3374 in a weight ratio of 75:25 instead of 65:35. The flame retardant "B" layers were made of a mixture of LLDPE 6806, 1-Nat-2P-W and Alcoa Spacerite™ S11 in a weight ratio of 25:56:19. The set temperature in the Berlyn extruder varied from 138° C. up to 193° C. The temperature in the Killion extruder varied from 132° C. up to 182° C. Die and feedblock at 193°.

Comparative Example 5 was made essentially as in Comparative Example 1 except the non flame retardant polymer was made of Reflex™ W101 and Fina™ 3374 in a weight ratio of 75:25 instead of 65:35.

Comparative Example 6 was performed essentially as in Comparative Example 2 except as follows. The non flame retardant material was made of Reflex™ W101 and Fina™ 3374 in a weight ratio of 75:25 instead of 65:35. The flame retardant mixture used in the "B" layer of Example 4 was melt blended with the non flame retardant material to result in an overall flame retardant concentration of weight percent of 35.

Examples 1–3 and Comparative Examples 1–4 were tested for Hanging Strip Flammability and for Tensile Stress. The test results, film layers and flame retardant concentrations are shown in Table 3.

TABLE 3

| | | FR | Hanging Strip | | Tensile Stress At 10% strain |
|---|---|---|---|---|---|
| Ex. | Layers | % | Flame | Comments | KPa (psi) |
| 4 | 13 | 35 | <1 sec, SE[1] | Drips but not flaming | 535(775) |
| C5 | 1 | 0 | 27 sec, all | Flaming drips | 635(920) |
| C6 | 1 | 35 | 4 sec, SE | Flaming drips | 597(865) |

[1]Self extinguished immediately after burner removed, could not be ignited.

As seen, a film of the invention exhibited improved flame retardant performance of a blend having the same overall concentration of flame retardant. The lower tensile stress value of Example 4 was attributed to poor mixing.

EXAMPLES 5–6

These examples were prepared to illustrate the use of halogen-free flame retardant materials with two different non-flame retardant materials.

Examples 5 and 6 were made in a manner similar to Example 1 except the materials were different and some process conditions were changed. In Example 5, the materials used in the not flame retardant "A" layers were Engage™ 8100 and LDPE 1550 melt blended in a weight ratio of 50:50. In Example 6, the materials used in the non-flame retardant "A" layers were Reflex™ W101 and Fina™ 3374 in a weight ratio of 75:25 instead of 65:35. In both examples, the materials used in the flame retardant "B" layers were a mixture of ATH FR and Elvax™ 410 in a weight ratio of 90:10. A KILLION single screw extruder (KILLION Model KTS-125, 32 mm single screw extruder with L/D of 24/1 and fitted with a mixing screw containing an Eagan mixing section) was used instead of a BERLYN single screw extruder to convey the non-flame retardant material to the "A" slots of the feedblock and a second KILLION single screw extruder, also fitted with a mixing screw containing an Eagan mixing section, conveyed the flame retardant material to the "B" slots. In examples 5 and 6, the first KILLION extruder was operated at temperatures in the first zone to the last zone ranging from 149° C. to 177° C. and 149° C. to 188° C., respectively. In both examples the temperatures of the feedblock, die and chill roll were maintained at 177° C., 177° C. and 20° C., respectively. The film speeds for Examples 5 and 6 were 4.9 and 5.5 m/min, respectively. The film thickness for both was about 130 microns.

Comparative Example 7 was made as in Example 5 except no flame retardant material was fed into the "B" slots and the flowrate was adjusted to result in a one layer film having a thickness of about 130 micrometers where all seven layers merged into a single indistinguishable layer.

Examples 5–6 and Comparative Example 8 were tested for Horizontal Burn. The test results, film layers and flame retardant concentrations are shown in Table 4.

TABLE 4

| | | FR | Horizontal Burn | |
|---|---|---|---|---|
| Ex. | Layers | % | Flame | Comments |
| 5 | 13 | 37 | 13 sec | No/low char, 2–3 drips, flames do not burn down length of rod, tape does not burn readily, bubbling during burning & no smoke. |
| 6 | 13 | 38 | 16 sec | Same as Ex 5 except 1–2 drips. |
| C7 | 1 | 0 | 120 sec | No char, flaming drips, burns entire length of rod and light smoke. |

As seen, the films of the invention exhibited substantial flame retardant performance.

EXAMPLE 7

These examples were prepared to illustrate the use of an inorganic flame retardant additive with two different non flame retardant materials.

Example 7 was made essentially as in Example 6 except as follows. The materials used in the non-flame retardant "A" layers were Rexflex™ W101 and Fina™ 3374 in a weight ratio of 75:25. The flame retardant additive in the "B" layer was 0521-48. The temperatures for the "A" layer extruder and the "B" layer extruder were set to increase from between 182° C. and 204° C. and between 171° C. and 227° C., respectively.

Comparative Example 8 was made essentially as in Example 7 except no flame retardant additive was fed into the "B" slots and the flow rate was adjusted to result in a one layer film having a thickness of about 130 micrometers.

Example 7 and Comparative Example 8 were tested for Horizontal Burn. The test results, film layers and flame retardant concentrations are shown in Table 5.

TABLE 5

| | | FR | Horizontal Burn | |
|---|---|---|---|---|
| Ex. | Layers | % | Flame | Comments |
| 7 | 13 | 42 | 18 sec | High char, no drips, flames do not burn down length of rod, tape does not burn readily, flakes/ash produced during burning & no smoke. |
| C8 | 1 | 0 | 127 sec | Flaming drips and all tape burned. |

As seen, the films of the invention exhibited substantial flame retardant performance.

EXAMPLES 8–10

These examples were prepared to illustrate the effect of flame retardant materials that melted a processing temperatures on layer thickness.

Example 8 was made essentially as in Example 1 except some equipment, processing conditions and materials were the different. The not flame retardant "A" layers were made of Escorene™ 3445 and the flame retardant "B" layers were made of a mixture of 50% Great Lakes Environstrand and 50% PPSC 912. The "B" layer material was conveyed to the "B" slots with a twin screw extruder (LEISTRITZ Model LSM 34 GL, 34 mm, having 42/1, commercially available from Leistritz Corp., Sommerville, N.J.). The temperature of the extruder for the "A" layers varied from 160° C. up to 193° C. The temperature of the extruder for the "B" layers ranged from 150° C. up to 177° C. The individual flowrates of A and B were such that flame retardant material comprised a calculated 25 weight percent of the overall multi-layered film and the overall thickness was measured at 100 micrometers.

Examples 9 and 10 were made in a similar manner to Example 8 except Example 9 used a 29 layer feedblock and Example 10 used a 91 layer feedblock.

Examples 8–10 were tested for both Hanging Strip and Horizontal Burn. The test results, film layers and flame retardant concentrations are shown in Table 6.

TABLE 6

| Ex. | Layers | FR % | Hanging Strip | Horizontal Burn |
|---|---|---|---|---|
| 8 | 13 | 25 | Melted and dripped would not ignite | <1 sec, low char, low smoke, extinguishes upon removal of flame |
| 9 | 29 | 25 | Melted and dripped would not ignite | <1 sec, low char, low smoke, extinguishes upon removal of flame |
| 10 | 91 | 25 | Melted and dripped would not ignite | <1 sec, low char, low smoke, extinguishes upon removal of flame |

As seen, the thickness of the flame retardant layer could be quite thin without adversely affecting the flame-retardant performance of the overall film by loss of layer integrity.

Each of the patents, patent applications, and publications cited herein is incorporated by reference as if each were individually incorporated by reference. The various modifications and alterations of this invention will be apparent to those skilled in the art without departing from the scope and spirit of this invention.

What is claimed is:

1. A unified multilayer film of at least five continuous film layers wherein at least one layer comprises a flame retardant film layer and at least one layer comprises a non-flame retardant film layer, wherein the flame retardant film comprises a halogenated organic flame retardant additive incorporated into a melt processible polymer.

2. The multilayer film of claim 1 wherein at least one internal layer comprises a flame retardant film layer.

3. The multilayer film of claim 1 that comprises flame-retardant film layers alternating with non flame retardant film layers.

4. The multilayer film of claim 3 wherein the flame retardant of the flame retardant films layers comprises the same flame retardant.

5. The multilayer film of claim 3 wherein the flame retardant of the flame retardant films layers comprises different flame retardants.

6. The multilayer film of claim 1 wherein the flame retardant additive comprises a mixture of two or more different flame retardant additives.

7. The multilayer film of claim 1 wherein the two outer-most layers comprise a non flame retardant film.

8. The multilayer film of claim 1 which is oriented.

9. The multilayer film of claim 1 comprising a flame retardant film layer, a non flame retardant film layer, and a tie layer therebetween.

10. The multilayer film of claim 1 comprising at least ten layers.

11. The multilayer film of claim 1 further comprising at least one pressure sensitive adhesive layer on at least one surface.

12. The multilayer film of claim 1 wherein the flame retardant additive comprises from 10 to 90 weight percent of the unified multilayer film.

13. The multilayer film of claim 1 wherein the flame retardant additive comprises 40 wt. % or more in each flame retardant layer.

14. The multilayer article of claim 1, wherein said melt processible polymer is a thermoplastic, a thermoplastic elastomeric or elastomeric material.

15. The multilayer article of claim 14, wherein said melt processible polymer is selected from the group consisting of homo- and copolymers of ethylene, propylene and butylenes.

16. The multilayer article of claim 14, wherein said a thermoplastic elastomeric material is selected from the group consisting of styrene-isoprene block copolymers, styrene-(ethylene-butylene) block copolymers, styrene-(ethylene-propylene) block copolymers, styrene-butadiene block copolymers; polyetheresters; elastomeric ethylene-propylene copolymers; thermoplastic elastomeric polyurethanes; polyvinylethers; and poly-α-olefins.

17. The multilayer article of claim 1 wherein said flame retardant is an antimony-halogen additive.

* * * * *

UNITED STATES PATENT AND TRADEMARK OFFICE
CERTIFICATE OF CORRECTION

PATENT NO.   : 6,280,845 B1
DATED        : August 28, 2001
INVENTOR(S)  : Kollaja, Richard A.

It is certified that error appears in the above-identified patent and that said Letters Patent is hereby corrected as shown below:

Title page,
Item [54], delete the title "MULTILAYER FILMS HAVING AT LEAST FIVE FILM LAYERS, WHEREIN AT LEAST ONE LAYER IS FLAME RETARDANT" and insert in place thereof -- MULTILAYER FILMS HAVING FLAME RETARDANT LAYERS --.
Item [87], PCT Pub. Date: delete "Jun. 10, 1999" and insert in place thereof -- Jun. 10, 1998 --.
Item [57], ABSTRACT,
Last sentence of ABSTRACT delete "layer" and insert in place thereof -- layers --.

Column 10,
Line 8, delete "in" and insert place thereof -- In --.

Column 11,
Line 48, delete "ftinctional" and insert in place thereof -- functional --.
Line 49, delete "inc." and insert in place thereof -- Inc. --.

Column 12,
Line 28, delete "(Herrid(e et al.)" and insert in place thereof -- (Herridge et al.) --.

Column 14,
Line 34, delete "NATSYNT$^{TM}$" and insert in place thereof -- NATSYN$^{TM}$ --.
Line 65, delete "ofthe" and insert in place thereof -- of the --.

Column 15,
Line 23, delete "Elyax$^{TM}$ 410" and insert in place thereof -- Elvax $^{TM}$ 410 --.
Line 44, delete "Fina$^{TM}$ 4 3374" and insert in place thereof -- Fina $^{TM}$ 3374 --.

Signed and Sealed this

Twelfth Day of November, 2002

Attest:

Attesting Officer

JAMES E. ROGAN
Director of the United States Patent and Trademark Office